Patented May 21, 1940

2,201,667

UNITED STATES PATENT OFFICE 2,201,667

INORGANIC CHEMICAL PRODUCT AND PROCESS OF PRODUCING THE SAME

Harry N. Huntzicker, Evanston, Ill., assignor to United States Gypsum Company, Chicago, Ill., a corporation of Illinois No Drawing. Application June 17, 1937, Serial No. 148,661

7 Claims. (Cl. 106—24)

The present invention relates to an improved cementitious material and to the process of producing the same. More particularly, the invention relates to a plastic material capable of yielding calcium hydroxide and suitable for use in the building trades.

The principal object of the present invention is to provide a plastic material containing or yielding Ca(OH)$_2$, and which is characterized by improved plasticity when mixed with water and applied with a trowel.

A further object is a material of the character described which does not dry out rapidly when applied to a dry and absorbent surface.

A still further object is an improved lime hydrate which works freely and easily under the trowel, spreads without sticking or pulling, and produces a greater yield of plastic putty per pound of lime hydrate employed.

A still further object is a plastic cementitious composition containing lime hydrate, characterized by an improved plasticity, pouring consistency and soaking consistency, and by a greater covering power per pound of dry hydrate employed.

Other objects will be apparent as the invention is hereinafter more fully described.

I have found that these and other objects may be accomplished by incorporating a relatively small amount of a suitable wetting agent with certain types of cementitious materials, as hereinafter more fully described.

The cementitious materials embraced within the present invention comprise those which contain calcium hydroxide, or which yield the same when mixed with water. By way of example of the cementitious materials which may be used in accordance with my invention, I may mention dolomitic or high-calcium limes, hydraulic lime, Portland cement, Pouzellanic cements, and similar compositions which exhibit an alkaline reaction when mixed with water.

The wetting agents which may be employed in accordance with my invention, in general, comprise those which are capable of lowering the surface tension of water containing calcium and/or magnesium ions in solution. A large number of substances are available which may be employed for the present purpose. Thus, for example, I may employ surface tension lowering materials of the following general types:

(1) $ROSO_3M$
(2) $RCOO(CH_2)_nSO_3M$
(3) $RCONH(CH_2)_nSO_3M$
(4) $RCOOCH_2(CHOH)_n\text{—}CH_2\text{—}OSO_2M$
(5) $RCH(SO_3M)\text{—}(CH_2)_n\text{—}CO\text{—}CH_2$
    $\quad RCH(SO_3M)\text{—}(CH_2)_n\text{—}CO\text{—}CH$
    $\quad RCH(SO_3M)\text{—}(CH_2)_n\text{—}CO\text{—}CH_2$ (6) 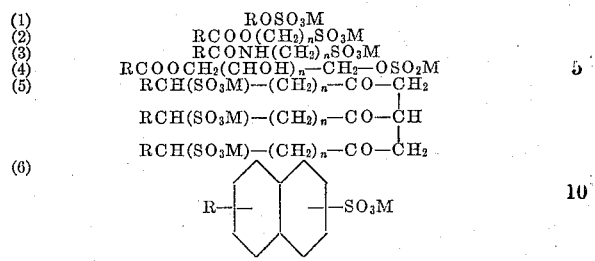

where R is an alkyl radical, preferably having at least 6 or 8 carbon atoms; M is an alkali metal, ammonium, or hydrogen radical; and $n$ is an integer usually greater than 1. The foregoing materials include some of the many well known types of surface active materials which may be employed in accordance with my invention. Thus I may mention sodium lauryl sulfate, Turkey red oil, salt of isopropyl naphthalene sulfonic acid, sulfonated castor oil, as well known typical examples of some of the many materials indicated by the foregoing general formulae. Many other materials of this type, however, will be apparent to those skilled in the art, and I do not wish to be restricted to the use of those particular materials. Thus, for example, quillai bark, saponin, and the like, may be employed if desired.

Surface tension reducing materials of the foregoing character are employed in amounts which will, of course, vary in the individual cases. In general, however, only a small amount, such as 0.1 to 5 pounds of wetting agent per ton of the cementitious base, is necessary to give the optimum reduction in surface tension and interfacial tension in order to attain the improvement in plasticity, working properties, etc. hereinafter mentioned. Thus, for example, the best results are obtained, in the case of sodium lauryl sulfate, when ¼ lb. thereof is used in the water necessary to hydrate a ton of the quicklime.

In order to illustrate my invention more clearly, a preferred embodiment thereof will now be described. It is to be understood, however, that this is done solely by way of illustration and is not to be construed as a limitation upon the spirit and scope of my invention, which has numerous important embodiments other than that hereinafter more particularly described.

According to a preferred embodiment of my invention, one-quarter pound of sodium lauryl sulfate is dissolved in the water required to hydrate one ton of quicklime. One ton of ground quicklime is hydrated with this dilute solution of sodium lauryl sulfate, in any desired manner, as for example, in a conventional lime hydrator. The product produced in the foregoing manner is far superior to a product prepared from the same grade of quicklime according to the methods of the prior art, as clearly indicated by the properties listed in Table I.

*Table I*

| Property tested | Grade of quicklime used | Average values | |
|---|---|---|---|
| | | Mix A (no wetting agent) | Mix B (sodium lauryl sulfate) |
| Plasticity index (Emley plasticimeter, A. S. T. M.). | Grade 1 | 141 | 270 |
| | Grade 2 | 237 | 316 |
| Pouring consistency (in cubic centimeters). | Grade 1 | 106 | 125 |
| Soaking consistency (in cubic centimeters). | Grade 1 | 94 | 112 |
| Putty yields (in cu. ft. per 100 lbs.). | Grade 1 | 2.30 | 2.57 |

In the foregoing table, the plasticity index was determined with the Emley plasticimeter according to A. S. T. M. methods, which are identical to those now used by the Bureau of Standards. The pouring consistency indicates the number of cubic centimeters of water required to produce a standard slurry from 100 grams of dry material. This consistency is determined by adding water to 50 grams of hydrate until the slurry will pour out of a standard cup to produce a 4 inch patty on a glass plate. The soaking consistency is determined by measuring the amount of water required by 100 grams of the dry material to produce a putty of standard consistency as determined with a Vicat apparatus for lime putty, A. S. T. M. Designation C110—34 T. The putty yields represent the volume in cubic feet of 100 pounds of finished putty, an increase in volume indicating, of course, an increase in yield and a corresponding decrease in density. The two grades of quicklime listed in the foregoing table differ in average particle size, grade 2 containing a greater percentage of finer material.

In addition to an improvement in the above listed properties, the product is characterized by increased water retentiveness, which prevents the putty from drying out rapidly when it is applied to a porous water-absorbent surface. The putty works freely and easily under a trowel without pulling or sticking and has many other advantages over a putty prepared without the employment of a suitable wetting agent.

The reason for the foregoing improvements in working properties has not been definitely established. However, it appears from theoretical considerations that the formation of a plastic putty from a dry hydrate proceeds in two steps. In the first step, the water soaks into the hydrate, permeating the voids between the hydrate particles and to a lesser extent permeating the particle itself, which is an aggregate of smaller fragments. In the second step, the water in intimate contact with the hydrate particles of colloidal size forms films of saturated $Ca(OH)_2$ around these particles, these films being held by the attraction of the positive charge on the colloidal particle for the hydroxyl ions in the film. Apparently this film lubricates the particles and thus makes the putty easy to separate and work. The water retentiveness is apparently due to the ionic attraction of the saturated water for the charged colloidal particles and also to the mechanical interference offered by the amount of liquid not so attracted. The improvement in working properties achieved in accordance with the present invention is apparently due to an intimate and uniform contact between the quicklime surfaces and the water solution as herein described during hydration, with the result that the hydrate soaks more uniformly and gels more completely.

Regardless, however, of the explanation of the improved results, it is to be understood that I do not wish to limit myself in any respect with regard to the theoretical basis or explanation thereof. Whether the theory is correct or not, it is apparent that the results achieved in accordance with my invention are of significant importance in the building arts, since they permit a greater yield of a more plastic and workable putty per pound of hydrate employed.

I am aware that it has heretofore been proposed to employ various wetting agents when mixing calcium sulfate hemihydrate (calcined gypsum) with water. The results obtained in the case of calcined gypsum, however, are, strangely enough, just the reverse of those obtained in the case of materials containing or yielding calcium hydroxide. Thus, in the case of calcined gypsum, the density of the material is increased, a more compact product being obtained. In the case of the materials embraced within the present invention, however, the density is decreased. The other properties, in general, exhibit a similar difference in the two cases.

In the foregoing detailed description of my invention it is apparent that many variations in detail may be made without departing from the spirit and scope thereof. Thus, for example, in the specific embodiment of my invention, the incorporation of the materials was accomplished by adding the wetting agent to the hydrating water in the conventional form of hydrator. It is apparent, however, that other means of introducing the reagents may be used if desired. Thus, they may be added in the dry state directly to the quicklime itself and the product hydrated in the usual manner. They may also be dispersed upon suitable carriers, such as quicklime and the like, by means of intensive ball milling or grinding, the resulting mixture being added to the quicklime during or before the hydrating step.

In the foregoing detailed description of my invention it is apparent that many variations may be made by those skilled in the art, without departing from the spirit and scope thereof. Thus, many other specific wetting agents, such as the various tetrahydronaphthalene sulfonic acids and the like, may be substituted for those hereinbefore particularly mentioned.

I therefore intend to be limited only in accordance with the following patent claims.

I claim:

1. The process of producing a substantially dry hydrated lime which comprises slaking quicklime with water containing small amounts of a high molecular weight compound having wetting properties and adapted to lower the surface tension of an aqueous calcium hydroxide solution.

2. The process of claim 1 wherein the wetting compound has the general formula RSO₃M where R is a member of the group consisting of alkyl radicals having at least 8 carbon atoms and aryl radicals having at least 2 condensed aromatic nuclei, and where M is a member of the group consisting of hydrogen, the alkali metals, and the ammonium radical.

3. The process of claim 1 wherein the wetting compound has the general formula RSO₃M where R is an aryl radical and M is a member of the group consisting of hydrogen, the alkali metals, and the ammonium radical.

4. The process of claim 1 wherein the wetting compound comprises sodium lauryl sulfate.

5. The process of producing substantially dry hydrated lime which comprises adding water to quicklime, said water containing a wetting agent dissolved therein in an amount sufficient to lower the surface tension of an aqueous solution of said hydrated lime, said wetting agent comprises a high molecular weight compound.

6. The process of producing a substantially dry hydrated lime which comprises adding water to quicklime, said water containing, dissolved therein, an amount of wetting agent equivalent to 0.1 to 5.0 pounds per ton of the dry hydrated lime product, said wetting agent being adapted to lower the surface tension of an aqueous solution of said hydrated lime and comprising a high molecular weight compound.

7. The process of producing substantially dry hydrated lime which comprises adding water to quicklime, said water containing, dissolved therein, an amount of sodium lauryl sulfate equivalent to about ¼ pound per ton of the hydrated lime product.

HARRY N. HUNTZICKER.